United States Patent [19]
Hellermann

[11] Patent Number: 6,119,743
[45] Date of Patent: *Sep. 19, 2000

[54] TIRE TREAD OF BUTADIENE COPOLYMER, POLYBUTADIENE AND AROMATIC OIL

[75] Inventor: Walter Hellermann, Dorsten, Germany

[73] Assignee: Huels Aktiengesellschaft, Marl, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/832,542

[22] Filed: Apr. 2, 1997

[30] Foreign Application Priority Data

Apr. 2, 1996 [DE] Germany .................. 196 13 195

[51] Int. Cl.$^7$ .................. B60C 11/00; C08K 05/01; C08L 09/00; C08L 09/06
[52] U.S. Cl. .................. 152/209 R; 524/526; 525/237
[58] Field of Search .................. 524/526; 525/237

[56] References Cited

U.S. PATENT DOCUMENTS

| | | | |
|---|---|---|---|
| 5,036,138 | 7/1991 | Stamhuis et al. | 525/237 |
| 5,047,483 | 9/1991 | Halasa et al. | 525/237 |
| 5,066,702 | 11/1991 | Hayashi et al. | 524/426 |
| 5,164,450 | 11/1992 | Tsutsumi et al. | 525/237 |
| 5,272,220 | 12/1993 | Rodgers et al. | 525/371 |
| 5,665,826 | 9/1997 | Halasa et al. | 525/237 |

FOREIGN PATENT DOCUMENTS

| | | |
|---|---|---|
| 56-122845 | 9/1981 | Japan . |
| 60-262839 | 12/1985 | Japan . |
| 61-16937 | 1/1986 | Japan . |

*Primary Examiner*—Robert E. Sellers
*Attorney, Agent, or Firm*—Oblon, Spivak, McClelland, Maier & Neustadt, P.C.

[57] ABSTRACT

A tire tread comprises a copolymer of butadiene with isoprene and/or styrene having a room temperature elasticity of between 5 and 35% at 22° C., polybutadiene rubber and an aromatic oil selected from the group consisting of an aromatic oil, naphthenic oil, paraffinic oil, and a mixture thereof.

3 Claims, No Drawings

TIRE TREAD OF BUTADIENE COPOLYMER, POLYBUTADIENE AND AROMATIC OIL

BACKGROUND OF THE INVENTION

1. Field of the Invention

The present invention relates to tire treads based on polydiene rubbers.

2. Discussion of the Related Art

The tire treads occupy a special place among the structural components of the tire. This is due in particular to the fact that the tire tread forms the narrow contact surface between vehicle and roadway. The characteristics of a vehicle during driving depend in particular on the type and equality of the tire tread. An optimum tire tread must cover an extensive requirement profile. In addition to high abrasion resistance and all-weather properties, tire tread should exhibit good winter properties and low rolling resistance. Antiskid properties, in particular on a wet roadway, are very important from the point of view of driving safety. In addition to the conventional braking with locking, the antilock braking system (ABS), which is increasingly improved and widely used in recent years, is becoming increasingly important also for the development of new tread polymers, which must be specially tailored to the particular conditions during ABS braking. EP-A 0 430 617 and EP-A 0 500 338 describe tread rubbers for improved ABS braking, containing the conventional aromatic oils as plasticizers.

The room temperature elasticity is of key importance for assessing the wet skid behavior on a laboratory scale. It has in the past proven useful for evaluating the wet skid behavior in the case of emulsion SBR.

In order to achieve good braking values, it is necessary to use tread polymers having high damping, i.e. having a particularly low room temperature elasticity. This generally requires the preparation of polymers having a high glass transition temperature according to DE-A-37 24 871. These polymers are unsaturated, elastomeric AB block copolymers comprising from 40 to 80% of a block A based on butadiene (having a uniformly distributed vinyl group content of from 8 to 60%), from 60 to 20% of a block B containing:

up to 60% of butadiene, from 0 to 60% of isoprene and from 0 to 45% of styrene, and where the vinyl content of the diene units is from 75 to 90%.

All percentages are expressed in weight percent unless otherwise specified.

Copolymers prepared by anionic polymerization and comprising butadiene and styrene are also suitable. These copolymers (referred to below as solution SBR) consist of a mixture of butadiene and from 15 to 35% of styrene, where the vinyl content of the butadiene units (based on butadiene) is between 35 and 90%.

These block copolymers (integral rubber) or solution SBR have a high glass transition temperature.

In Table 1, this is realized in the case of Example 2 using a typical AB block copolymer B as a model. Compared with the base (Example 1), values of 101 and 116 are obtained during braking with blocking on asphalt and concrete, with an elasticity of 8. However, the decrease in the case of ABS braking on asphalt to 85% compared with the base is completely surprising. This means that the wet skid potential incorporated in the integral rubber molecule cannot be realized on the road under slight stresses as represented by ABS braking on asphalt at low speeds.

During braking on concrete, i.e. with higher stress, virtually the standard level is achieved with a rating of 98%.

SUMMARY OF THE INVENTION

As a complete surprise to a person skilled in the art, it has now been found that ABS braking is substantially improved by preparing a blend of polybutadiene rubber (BR) with such a high-$T_G$ rubber, in spite of a deterioration in the test data.

These results are surprising since the blend component polybutadiene rubber has a low glass transition temperature ($T_G$) and a deterioration in wet skid was, therefore, actually expected on adding polybutadiene rubber.

DESCRIPTION OF THE PREFERRED EMBODIMENT

A typical AB block copolymer, such as, for example, polymer C in Example 3, can be used to show that it is possible under certain conditions to prepare the two blocks A and B separately and to obtain the tire characteristics of the original AB block copolymer again by subsequent blending. Thus, terpolymer E corresponds exactly to the composition of the B block of polymer C, although the polymerization was carried out by an adiabatic procedure. A blend of 50 phr of BR with 50 phr of terpolymer E (Example 5) is thus comparable with the AB block copolymer with regard to the composition. However, during braking with blocking, the tire data of Example 5 are substantially better than in the case of block copolymer C in Example 3.

If the B block of the AB block copolymer C is prepared by isothermal polymerization (terpolymer D) and then blended again in the same ratio with 50 phr of BR (Example 4), the resulting level of 90% does not reach the ABS braking level of the AB block copolymer C in Example 3, in spite of improved laboratory values (room temperature elasticity of 6). It Is not until the aromatic oil in the formulation of the mixture is replaced by a naphthenic oil that substantially improved ABS braking is achieved, with 108% in Example 6. At the same time, the rolling resistance is improved to 102%.

Copolymers based on butadiene and isoprene and/or styrene are preferably used. The following may be mentioned as a non-limiting example: the isolated B block from an AB block copolymer based on from 5 to 60% of butadiene, up to 60% of isoprene and up to 45% of styrene, where the vinyl content of the diene units is from 50 to 90%; the butadiene content is preferably from 30 to 60%.

Copolymers of butadiene and styrene containing, from 65 to 85% of 1,3-butadiene and from 35 to 15% of styrene, the vinyl content of where the diene units are between 35 and 90%, are also preferred.

The ratio of the blend of polybutadiene rubber and the above copolymers may be from 10 to 60 phr of polybutadiene rubber and
from 90 to 40 phr of copolymer.

It is, thus an object of the present to provide a tire tread comprising a copolymer of butadiene and isoprene and/or styrene which has room temperature elasticity of between 5 and 35% at 22° C., polybutadiene rubber blended therein, and conventional additives; the tire tread exhibits substantially improved rolling resistance and wet skid behavior during ABS braking.

The preparation process for a copolymers in accordance with the present invention is described in detail below.

An inert organic solvent is used as the reaction medium. Hydrocarbons having 6 to 12 carbon atoms, such as pentane, hexane, heptane, octane and decane, and cyclic analogs thereof are particularly suitable. Aromatic solvents, such as, for example, benzene, toluene, xylenes, etc., are also suitable. Mixtures of the solvents described above can of course also be used.

Alkyllithium compounds which are readily obtained by reacting lithium with the corresponding alkyl halides are used as the catalyst. The alkyl radicals have 1 to 10 carbon atoms. Individual hydrogen atoms may be substituted by phenyl radicals. The following alkyllithium compounds are particularly suitable: methyllithium, ethyllithium, n-butyllithium and pentyllithium; n-butyllithium is preferred.

In order to improve the cold flow, at least one polymerization stage is advantageously carried out in the presence of small amounts of a branching agent, such as, for example, divinylbenzene (DVB). Not more than 0.5 parts of DVB is used per 100 parts of monomers. Such an addition is omitted if coupling is envisaged after the polymerization.

The type and amount of catalyst and branching agent are in general chosen so that the block copolymer obtained has the following properties:

| | |
|---|---|
| Mooney viscosity (ML$_{1-4}$, 100° C., DIN 53 523) | 35 to 120 |
| Nonunifonnity U = (Mw/Mn) − 1, determined by analysis by gel permeation chromatography (GPC analysis) | 0.6 to 3.0 |
| Deformation elasticity (80° C., DIN 53 514) | ≧20 |

In the present process, block B is prepared in the presence of a cocatalyst.

In this case, it is of interest to obtain a polymer having as high a proportion as possible of 1,2 and/or 3,4 structural units:

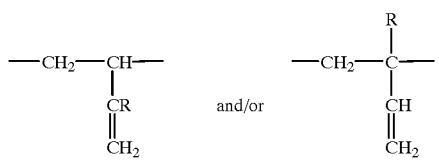

where R=H (butadiene) or R=CH$_3$ (isoprene).

The choice of the cocatalysts therefore depends on their ability to regulate the microstructure, i.e. to steer the course of the polymerization toward as complete formation as possible of 1,2 and/or 3,4 structural units.

The cocatalyst is generally selected from the group consisting of amine and ether-containing tertiary amine.

Mixtures of different cocatalysts can of course also be used.

Suitable ethers comprise in particular:

dialkyl ethers of ethylene glycol and of diethylene glycol, whose alkyl groups each have up to 4 carbon atoms, such as ethylene glycol diethyl ether (DEE).

Particularly in the preparation of branched block copolymers, are ethers of the general formula:

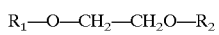

where R$_1$ and R$_2$ are different alkyl radicals. Preferred alkyl radicals are methyl, ethyl, n-propyl, isopropyl, n-butyl, isobutyl, sec-butyl and tert-butyl. The sum of the carbon and atoms of the two radicals R$_1$ and R$_2$ is preferably from 5 to 7, and more preferably 6. A particularly suitable ethylene glycol ether is the compound in which R$_1$=ethyl and R$_2$=tert-butyl. The glycol ethers are obtainable, for example according to the principle of the Williamson synthesis, from a sodium alcoholate and an alkyl halide. The ethers of the formula

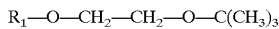

can be prepared in a simple manner by reacting the corresponding alcohol

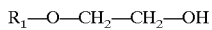

with isobutene in the presence of an acidic ion exchanger; acidic ion exchangers are described for instance in Kirk-Othmer Encyclopedia of Chemical Technology, Volume 13, pages 685–686 and include by way of non limiting example, acrylic and methacrylic acid that have been cross-linked with a difunctional monomer, e.g. divinyl benzene.

Suitable tertiary amines are, for example, N,N,N',N'-tetramethylethylenediamine, N,N,N',N'-tetraethylethylenediamine and triethylenediamine.

Suitable ether-containing amines are N-methylmorpholine and N-ethylmorpholine.

The cocatalyst is used in a ratio of from 2:1 to 30:1, in particular from 2:1 to 15:1, based on the number of moles of the catalyst. At higher temperatures, larger amounts of cocatalyst are generally required in order to achieve the desired microstructure regulation. Reaction temperatures of 100° C. should not be exceeded. It is also possible to work with increasing or decreasing temperature, however, in this case it is necessary to ensure that the microstructure is not fundamentally changed.

In the preparation of block B and optionally A, styrene is added as comonomer. By suitable measures, it should be ensured that the content of polystyrene blocks in the AB block copolymer does not exceed 2% by weight. A method for determining the content of polystyrene blocks is described in the standard work Houben-Weyl "Methoden der organischen Chemie", Volume 14/1 (1061), page 698.

It is known that some compounds proposed as cocatalysts have properties which suppress the formation of polystyrene blocks. The same property is possessed by compounds which are referred to as randomizers and are generally potassium salts of alcoholates and organic carboxylic and sulfonic acids, In a particular embodiment of the process, the "living polymers" present after the end of the polymerization can be reacted with a coupling agent to give branched or star-shaped block copolymers. The term "living polymer" is used to denote a polymer or oligomer containing an ionic end group.

Suitable coupling agents are polyepoxides, such as epoxidized linseed oil; polyisocyanates; polyketones, such as 1,3,6-hexanetrione; polyanhydrides, such as, for example, the dianhydride of pyromellitic acid; and dicarboxylic esters, such as dimethyl adipate. Particularly suitable are:

the tetrahalides of the elements Si, Ge, Sn and Pb, in particular $SiCl_5$;

organic compounds of the general formula $R_n[SiHal_3]_n$, where "Hal" denotes a halogen and where n=1 to 6, in particular n=1 or 2; and where R is an n-valent organic radical, for example an aliphatic, cycloaliphatic or aromatic radical having 6 to 16 carbon atoms; 1,2,4-tris(2-trichiorosilyiethyl)cyclohexane, 1,8bis(trichlorosilyl)octane and 1-(trichlorosilyl)octane may be mentioned by way of example;

The microstructure is determined by IR spectroscopy.

The percentage of rubber, which has a star-shaped structure after reaction with a coupling agent and is distinguished by a considerably higher molecular weight than the uncoupled rubber, is regarded as the coupling yield. The determination is carried out by GPC analysis, tetrahydrofuran being used as the solvent and polystyrene as column material. The polymers are characterized by means of a light scattering detector. For this purpose, samples are taken from the reactor before the addition of the coupling agent and at the end of the reaction. The deformation hardness (DH) and the deformation elasticity (DE) are determined by the customary methods of measurement (DIN 53 514).

The oils to be used or any desired combinations of these oils may be characterized as follows (cf. Kautschuk+Gummi Kunststoffe 39th year No. 9/86, page 816):

|  | Paraffinic | Paraffinic/ naphthenic | Naphthenic | Naphthenic/ aromatic | Aromatic | Very aromatic |
|---|---|---|---|---|---|---|
| $C_A$ in % (aromatic) | <10 | <15 | 0–30 | 25–40 | 35–50 | 50–60 |
| $C_H$ in % (naphthenic) | 20–30 | 25–40 | 30–45 | 20–45 | 25–40 | <40 |
| $C_P$ in % | 55–75 | 55–65 | 35–55 | 25–45 | 20–35 | <25 |

$C \hat{=}$ Carbon atom organic compounds which contain at least one group:

$SiHal_2$, such as, for example, dimethylsilyl chloride;

halosilanes of the general formula $Si(H)_m(Hal)_{4-m}$ where $3 \geq m > 1$; and di- and trivinylbenzenes, such as, for example, 1,4-divinylbenzene.

It has proven expedient to use divinylbenzene as the coupling agent.

The process can be carried out both batchwise and continuously.

A hydrocarbon mixture which comprises about 50% of hexane is used as the solvent. Further components of this hydrogenated $C_6$ cut are in particular pentane, heptane and octane and isomers thereof. The solvent is dried over a molecular sieve of pore diameter 0.4 nm so that the water content is reduced below 10 ppm and it is then stripped with $N_2$.

The organic lithium compound is n-butyllithium, which, unless stated otherwise, is used in the form of a 20% strength by weight solution in hexane.

Before they are used, the monomers isoprene and styrene are refluxed over calcium hydride for 24 hours, distilled off and pretitrated with n-butyllithium in the presence of o-phenanthroline.

The glycol ethers are distilled over calcium hydride and then pretitrated with n-butyllithium in the presence of o-phenanthroline.

The divinylbenzene (DVB) is a mixture of m- and p-divinylbenzene and is used in the form of a 64% strength solution in hexane. The conversion is determined by determining the solids content after evaporation of the solvent and of the monomers.

They may be used in the range from 10 phr to 50 phr, i.e. the amount of oil depends in each case on the amount of active, reinforcing filler used.

The treads according to the invention may contain either aromatic or naphthenic or paraffinic oil or any desired blend from the abovementioned specifications. Aromatic or naphthenic oil is preferably used. Instead of a conventional active carbon black, a mineral filler (for example silica) or a combination of the two (carbon black and silica) may also be used. The carbon black or silica is used in an amount of from 50 to 90 phr. In the case of a blend of the two components, the amount of the blend is likewise from 50 to 90 phr.

The tread rubber is prepared according to the general vulcanization mix (see Examples) with 50 phr of carbon black and 10 phr of aromatic oil and is subjected to a laboratory test, where the room temperature elasticity at 22° C. is determined. This may be an integral rubber or any desired blend of the stated rubbers.

If the room temperature elasticity of the mix is between 5 and 35%, the ABS braking can be substantially improved by preparing a blend with natural rubber (NR).

The production of the tire treads is carried out in a manner known per se by mixing the rubber component with the additives. Conventional additives are, for example, carbon black, silica, a plasticizer, an accelerator, an antiaging agent, an antiozonant and a resin. Mixing is carried out in conventional mixing units, for example a kneader or a roll mill. The temperature to be established depends in a known manner on the composition of the compounds and on the methods of mixing.

TABLE 1

|  |  | Example | | | | | |
|---|---|---|---|---|---|---|---|
|  |  | 1 Base | 2 | 3 | 4 | 5 | 6 |
| Tread Polymer Composition |  | A | B | C | D | E | D |
| Tread Rubber (phr) |  | 100 | 100 | 100 | 50 | 50 | 50 |
| BR (phr)[a] |  | — | — | — | 50 | 50 | 50 |
| Oil type | Aromatic | 37.5 | 10 | 10 | 10 | 10 | — |
|  | Naphthenic[b] | — | — | — | — | — | 10 |
| Filler | N-339 | 75 | 50 | 50 | 50 | 50 | 50 |
| Laboratory data | Hardness (Shore A) % at 0° C. | 67 | 99 |  | 91 | 80 | 85 |
|  | Hardness (Shore A) % at 22° C. | 65 | 68 | 66 | 66 | 66 | 65 |
|  | Elasticity (%) at 22° C.[1] | 29 | 8 | 30 | 10 | 23 | 17 |
|  | Elasticity (%) at 75° C.[1] | 45 | 49 | 57 | 54 | 54 | 56 |
|  | Abrasion in mm³ [2] | 40 | 150 | 128 | 146 | 144 | 149 |
| Tire data[3] Wet skid | Braking with blocking | Asphalt[4] | 100 | 101 | 101 | 106 | 102 | 106 |
|  |  | Concrete[4] | 100 | 116 | 103 | 109 | 106 | 110 |
|  | ABS braking | Asphalt[5] | 100 | 84 | 100 | 90 | 95 | 108 |
|  |  | Concrete[5] | 100 | 98 | — | — | — | — |
|  | Rolling resistance[6] |  | 100 | 83 | 101 | 92 | 99 | 102 |

Explanations for Table 1
[1] Test according to DIN 53 512
[2] Test according to DIN 53 516
[3] Tire size 195/65 R 15, all ratings relate to the base of Example 1, all values > 100 are better than the base
[4] Braking with blocking from a speed of 50 km/h at air pressure 2.2 bar, wet
[5] 4-wheel ABS braking from a speed of 50 km/h, wet
[6] Measured on a roller-type test stand at a speed of 110 km/h, air pressure 2.5 k g/cm², load 330 kg, temperature 35° C., all values > 100 are better than the base
[a] Based on Li catalyst, e.g. CB 45
[b] e.g. Circosol 4240, Puccini Q8 60P Having generally described this invention, a further understanding can be obtained by reference to certain specific examples which are provided herein for purpose of illustration only and are not intended to be limiting unless otherwise specified.

EXAMPLES

Polymer A (base)

BUNA® HULS EM 1712 is a conventional styrene/butadiene rubber extended with 37.5 parts of oil. In contrast to the subsequently stated, general vulcanization mix, BUNA® HULS EM 1712 is vulcanized in the following composition:

137.5 parts of BUNA ® HULS EM 1712
75 parts of carbon black N 339
3 parts of aromatic oil
3 parts of zinc oxide
2 parts of stearic acid
1 part of VULKANOX ® 4010 NA
1 part of VULKANOX ® 4020
1 part of KORESIN ®
1.5 parts of CBS
0.2 part of DPG
2 parts of sulfur

Preparation of AB Block Copolymer B 275 parts of hexane, 40 parts of 1,3-butadiene and 0.03 part of DVB are initially introduced into a first V2A stainless steel stirred autoclave flushed with dry nitrogen and are titrated with n-butyllithium (Buli) after drying over a molecular sieve (0.4 nm) with thermoelectric monitoring. The polymerization is initiated at 50° C. by adding 0.032 part of n-butyllithium. In spite of cooling, the temperature increases briefly to not more than 62° C. After 107 minutes, and after the initially introduced 1,3-butadiene was virtually completely reacted, an IR sample is taken and is worked up in the same way as the end product.

Immediately thereafter, the content of a second V2A stainless steel stirred autoclave (40° C.) is added in the course of 100 seconds. This contains a solution of 15 parts of 1,3-butadiene, 30 parts of isoprene and 15 parts of styrene in 190 parts of hexane, which solution has been titrated with n-butyllithium.

Immediately thereafter, 2.0 parts of ethylene glycol dimethyl ether are added. The temperature is kept constant at 50° C. 4 hours after the initiation of the polymerization, the polymerization is stopped by adding a solution of 0.5 part of 2,2-methylenebis(4-methyl-6-tert-butylphenol) in 2 parts of moist toluene. The solvent is distilled off with steam and the polymer is dried for 24 hours at 70° C. in a forced-circulation oven.

| Microstructure: | | |
|---|---|---|
| Butadiene | 1,4-trans | : 23 |
| | 1,2 | : 17 |
| | 1,4-cis | : 17 |
| Isoprene | 3,4 | : 24 |
| | 1,4 | : 3 |
| Styrene | | 16 |

Preparation of AB Block Copolymer C 275 parts of hexane, 50 parts of 1,3-butadiene and 0.03 part of DVB are initially introduced into a first V2A stainless steel stirred autoclave flushed with dry nitrogen and are titrated with n-butyllithium (Buli) after drying over a molecular sieve (0.4 nm) with thermoelectric monitoring. The polymerization is initiated at 50° C. by adding 0.032 parts of n-butyllithium. In spite of cooling, the temperature increases briefly to not more than 62° C. After 107 minutes, and after the initially introduced 1,3-butadiene was virtually completely reacted, an IR sample is taken and is worked up in the same way as the end product.

Immediately thereafter, the content of a second V2A stainless steel stirred autoclave (40° C.) is added in the course of 100 seconds. This contains a solution of 20 parts of 1,3-butadiene, 15 parts of isoprene and 15 parts of styrene in 190 parts of hexane, which solution has been titrated with n-butyllithium.

Immediately thereafter, 2.0 parts of ethylene glycol dimethyl ether are added. The temperature is kept constant at 50° C. 4 hours after the initiation of the polymerization, the polymerization is stopped by adding a solution of 0.5 part of 2,2-methylenebis(4-methyl-6-tert-butylphenol) in 2 parts of moist toluene. The solvent is distilled off with steam and the polymer is dried for 24 hours at 70° C. in a forced-circulation oven.

| Microstructure: | | |
|---|---|---|
| Butadiene | 1,4-trans | : 29 |
| | 1,2 | : 19 |
| | 1,4-cis | : 22 |
| Isoprene | 3,4 | : 10 |
| | 1,4 | : 3 |
| Styrene | | 16 |

Preparation of Terpolymer D 400 parts of hexane and a monomer mixture comprising 40 parts of 1,3-butadiene, 30 parts of isoprene, 30 parts of styrene, 0.02 part of DVB and 1.0 part of ethylglycol tert-butyl ether are initially taken in a V2A stainless steel autoclave flushed with dry nitrogen and are titrated with butyllithium after drying over a molecular sieve (0.4 nm) with thermoelectric monitoring. The polymerization is initiated at 40° C. by adding 0.054 part of n-butyllithium. The temperature is kept in the range from 40 to 60° C. with cooling. At this final temperature, the batch may continue to react for 2 hours. After cooling to 50° C., the polymerization is stopped by adding a solution of 0.5 part of 2,2'-methylenebis(4-methyl-6-tert-butylphenol) in 2 parts of moist toluene. The solvent is distilled off with steam and the polymer is dried for 24 hours at 70° C. in a forced-circulation oven.

| Microstructure | | |
|---|---|---|
| Butadiene: | 1,4-trans: | 7 |
| | 1,2: | 28 |
| | 1,4-cis: | 5 |
| Isoprene: | 3,4: | 20 |
| | 1,4: | 8 |
| Styrene: | | 32 |

Preparation of Terpolymer E

The preparation is carried out as for terpolymer D but the temperature after the addition of 0.054 part of n-butyllithium is increased to about 120° C. without cooling. At this temperature, the batch may continue to react for 30 minutes.

| Microstructure: | | |
|---|---|---|
| Butadiene | 1,4-trans | : 10 |
| | 1,2 | : 27 |
| | 1,4-cis | : 9 |
| Isoprene | 3,4 | : 18 |
| | 1,4 | : 5 |
| Styrene | | 31 |

General Vulcanization Mix

Vulcanization mixes of the following composition are prepared from the tread rubbers according to the invention (cf. Table 1):

```
100 parts of tread rubber
 50 parts of carbon N 339
 10 parts of aromatic or naphthenic oil
  3 parts of zinc oxide
  1 part of stearic acid
  1 part of N-isopropyl-N'-phenyl-p-phenylenediamine
    (VULKANOX ® 4010 NA)
  1 part of N-(1,3-dimethylbutyl)-N'-phenylenediamine
    (VULKANOX ® 4020)
  1 part of KORESINO, reaction product of p-tert-
    butylphenol with acetylene
1.3 parts of N-cyclohexyl-1-benzothiazolesulfenamide
    (CBS, VULKACIT ® CZ)
0.3 part of diphenylguanidine (DPG, VULKACIT ® DZ)
1.6 parts of sulfur
```

The products VULKANOX® 4010 NA, VULKANOX® 4020, VULKACIT® CZ and VULKACIT® DZ are obtainable from Bayer AG, Leverkusen, and KORESIN® from BASF AG, Ludwigshafen.

These Examples are also discussed in the priority document German Patent Application 196 13 193.6 which is incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters: Patent of the United States is:

1. A tire tread comprising (a) a copolymer of butadiene and a monomer selected from the group consisting of isoprene, styrene and a mixture of said monomers thereof;

(b) a polybutadiene rubber blended therein; (c) an additive other than naphthenic and/or paraffinic oil and carbon black; (d) naphthenic oil; and (e) carbon black; wherein said copolymer has a room temperature elasticity of between 5 and 35% at 22° C.; wherein the blend ratio of said copolymer to said polybutadiene is from 40:60 to 50:50; wherein said naphthenic oil contains less than 30% carbon atoms in aromatic structure.

2. The tire tread of claim 1, wherein said copolymer, comprises:

from 5 to 60%-wt. of butadiene,
up to 60%-wt. of isoprene and
up to 45%-wt. of styrene, and wherein the vinyl content of the diene units is from 50 to 90% - wt based on total copolymer.

3. The tire tread composition of claim 1, wherein the blend ratio of said copolymer to said polybutadiene rubber is from 90:10 to 40:60.

* * * * *